US012103703B2

(12) United States Patent
Block et al.

(10) Patent No.: US 12,103,703 B2
(45) Date of Patent: Oct. 1, 2024

(54) SYSTEMS AND METHODS FOR DETECTING A JAM OF A FLAP OF A WING OF AN AIRCRAFT

(71) Applicant: THE BOEING COMPANY, Chicago, IL (US)

(72) Inventors: Samuel L. Block, Seattle, WA (US); Bret Alan Bowers, Langley, WA (US); Kevin R. Tsai, Seattle, WA (US)

(73) Assignee: The Boeing Company, Chicago, IL (US)

(*) Notice: Subject to any disclaimer, the term of this patent is extended or adjusted under 35 U.S.C. 154(b) by 418 days.

(21) Appl. No.: 17/530,545

(22) Filed: Nov. 19, 2021

(65) Prior Publication Data

US 2023/0159183 A1 May 25, 2023

(51) Int. Cl.
*B64D 45/00* (2006.01)
*B64C 9/34* (2006.01)

(52) U.S. Cl.
CPC ............ *B64D 45/0005* (2013.01); *B64C 9/34* (2013.01); *B64D 2045/001* (2013.01)

(58) Field of Classification Search
CPC .... B64C 9/16; B64C 9/18; B64C 9/20; B64C 9/22; B64C 9/24; B64C 9/26
See application file for complete search history.

(56) References Cited

U.S. PATENT DOCUMENTS

| 2,779,555 | A | * | 1/1957 | Danielson | B64C 9/16 244/216 |
| 6,299,108 | B1 | * | 10/2001 | Lindstrom | B64C 9/02 244/99.3 |
| 8,104,721 | B2 | | 1/2012 | Pohl | |
| 9,108,724 | B2 | | 8/2015 | Airbus | |
| 2010/0100355 | A1 | | 4/2010 | Marx | |
| 2012/0304475 | A1 | | 12/2012 | Wallen | |
| 2016/0001894 | A1 | * | 1/2016 | Jones | B64D 45/0005 701/3 |
| 2016/0288921 | A1 | * | 10/2016 | Padilla | B64C 9/00 |
| 2018/0281927 | A1 | * | 10/2018 | Schlipf | B64C 9/22 |

FOREIGN PATENT DOCUMENTS

WO WO-03013956 A1 * 2/2003 ............... B64C 9/16

OTHER PUBLICATIONS

Extended European Search Report for EP 22208281.0-1004, dated Mar. 24, 2023.

* cited by examiner

*Primary Examiner* — Timothy D Collins
*Assistant Examiner* — Terri L Filosi
(74) *Attorney, Agent, or Firm* — Joseph M. Butscher; The Small Patent Law Group LLC

(57) ABSTRACT

A jam detection system for a flap of a wing of an aircraft includes a linkage coupled to the flap and a support of the wing, and a sensor configured to detect a position of at least a portion of the linkage. The sensor is further configured to compare the position of the least a portion of the linkage to a jam threshold to determine if a jam condition exists. The linkage can also be coupled to a carriage moveably coupled to the support.

20 Claims, 8 Drawing Sheets

FIG. 5

SYSTEMS AND METHODS FOR DETECTING A JAM OF A FLAP OF A WING OF AN AIRCRAFT

FIELD OF THE DISCLOSURE

Examples of the present disclosure generally relate to systems and methods for detecting a jam of a flap of a wing of an aircraft.

BACKGROUND OF THE DISCLOSURE

A typical airplane includes wings having control surfaces, such as flaps. For example, a wing includes a flap that is moveably connected to a main body.

A flap is typically coupled to a plurality of supports, such as main supports and optionally a mid-idler support between two main supports. The main supports include actuators that are configured to drive motion of the flap between retracted and extended positions, while the mid-idler support typically does not include an actuator.

A jam at a main support normally causes skew in the flap during deployment, with one side of the flap further extended or retracted than the other. Certain known airplanes include skew detection systems, which detect the skew. As another example, an actuator torque limiter stops motion before skew is detected.

However, when an idler support between main supports jams, little to no skew occurs, and the existing skew detection system cannot detect the jam. Instead, such a jam at a mid-idler support can cause the flap to experience a high magnitude of load, nearly instantaneously, as both actuators on either side continue to push at maximum capacity, which can cause damage to structures, such as the supports and/or the flap.

As one possible solution, the flap and idler support can be sized, shaped, and configured to endure such extreme loads and trip a torque brake setting before potentially damaging primary structure. However, such a design likely results in a very large weight penalty.

Certain wings require a mid-idler support for low and high speed deflection control at the inboard flap due to the length and thin nature of the flap. Attempting to design such a wing without a mid-idler support may result in aerodynamic performance penalties due to greater deflections.

In short, certain wings can include supports less susceptible to jamming, but may be too large, bulky, heavy, and/or the like for certain types of aircraft.

SUMMARY OF THE DISCLOSURE

A need exists for an efficient and effective system and method for detecting a jam in relation to a support for a flap of a wing of an aircraft. Further, a need exists for a jam detection system for a mid-idler support of a flap of a wing of an aircraft.

With those needs in mind, certain examples of the present disclosure provide a jam detection system for a flap of a wing of an aircraft. The jam detection system includes a linkage coupled to the flap and a support of the wing, and a sensor configured to detect a position of at least a portion of the linkage. The sensor is further configured to compare the position of the least a portion of the linkage to a jam threshold to determine if a jam condition exists. In at least one example, the linkage is further coupled to a carriage moveably coupled to the support.

In at least one example, the sensor is further configured to output a jam signal in response to the position of the portion of the linkage meeting or exceeding the jam threshold. In response to receiving the jam signal, a control unit is configured to stop one or more actuators that are configured to move the flap between a retracted position and an extended position.

As an example, the support is a mid-idler support between a first main support and a second main support. As a further example, the support is devoid of an actuator.

In at least one example, the sensor is a rotary variable displacement transducer configured to detect an angular position of the at least a portion of the linkage. In at least one other example, the sensor is a linear variable displacement transducer configured to detect a linear position of the at least a portion of the linkage.

In a least one example, the linkage includes a first link arm pivotally coupled to a bracket of the support, a second link arm pivotally coupled to the first link arm, and a third link arm pivotally coupled to the second link arm and the flap. As a further example, the third link arm is coupled to a carriage that is moveably coupled to the support by a spherical bearing. In at least one example, the sensor is configured to detect an angular position of the first link arm.

Certain examples of the present disclosure provide a jam detection method for a flap of a wing of an aircraft. The jam detection method includes detecting, by a sensor configured to detect a position of at least a portion of a linkage coupled to the flap and a support of the wing; and comparing, by the sensor, the position of the least a portion of the linkage to a jam threshold to determine if a jam condition exists.

Certain examples of the present disclosure provide an aircraft including a wing having a flap and a support, and a jam detection system, as descried herein.

BRIEF DESCRIPTION OF THE DRAWINGS

FIG. 5 illustrates a lateral view of the jam detection system coupled to a support and a flap in a retracted position, according to an example of the present disclosure.

DETAILED DESCRIPTION OF THE DISCLOSURE

Figure 1:
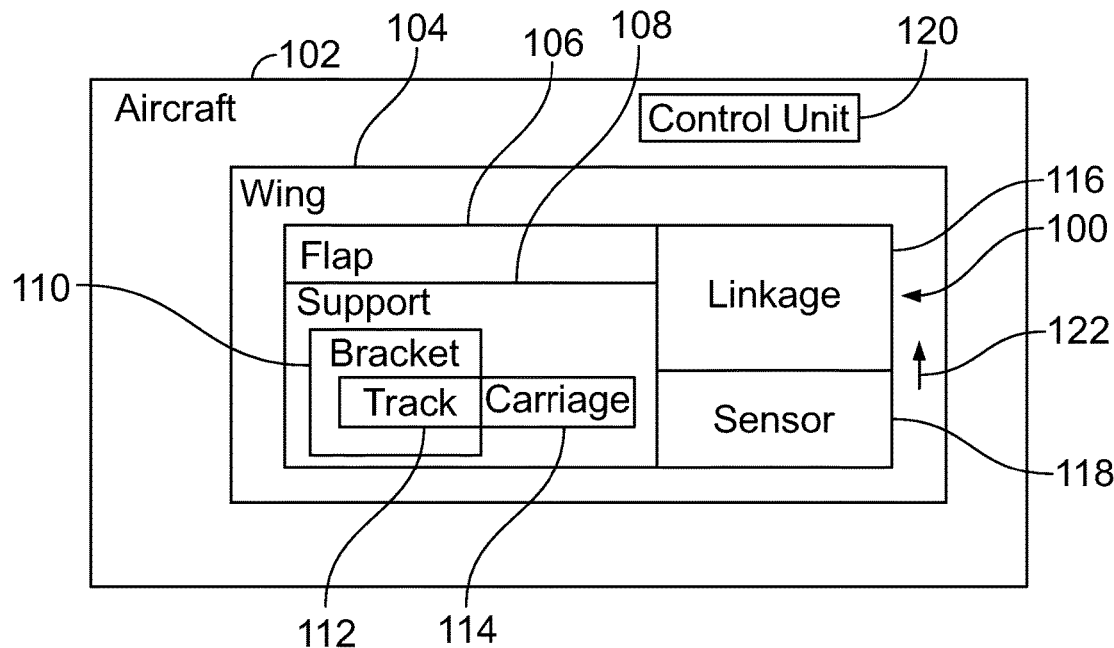
FIG. 1 illustrates a schematic block diagram of a jam detection system for an aircraft, according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a jam detection system for flap supports. In at least one embodiment, the jam detection system is configured for a mid-idler support, and includes a sensor such as a rotary or linear variable displacement transducer coupled to a linkage, such as a kinematic four-bar linkage, which includes one or more bars. The system is configured to detect a jam at the support during flap actuation by being mounted to both the flap and a carriage, which are coupled together through a link to allow slight relative motion that can be detected by the sensor. Under normal operation, relative motion between the flap and carriage is minimal and does not trip a predetermined jam detection threshold.

Examples of the present disclosure are configured to detect and annunciate (for example, output a signal indicating) a jam at a support, such as at a flap mid-idler support. Examples of the present disclosure provide systems and methods for reducing induced loads in primary structure (for example, flaps and flap supports) while increasing sensitivity in relation to jam detection.

In at least one embodiment, the sensor is a rotary variable displacement transducer mounted on a kinematic four-bar linkage. The linkage is attached to the carriage using a spherical bearing, and to the flap using a hinge. The carriage and flap are attached to each other with two links, allowing relative deflection which can be sensed by the sensor. The system accurately detects any off-nominal deflection caused by a jam and quickly shuts down the flap actuation prior to the flap and idler developing full combined torque brake load.

In at least one embodiment, the sensor measures the angle of a first link arm. During normal operation, the first link arm moves in one rotational direction. However, when a jam is encountered, the first link arm both reverses the rotational direction and measures a different angle than expected. The sensor detects the rotational difference (such as via an angular difference), thereby detecting when a jam has occurred, and distinguishes a jam scenario from the slight nominal rocking that one or more links experience during normal operation (to avoid falsely tripping the sensor when there is no jam). For a jam during retraction or extension, at any point during the stroke, the first link arm clearly measures and senses the difference.

In an example, the sensor can be programmed to recognize an expected nominal position based on flap positioning, or it can compare against a counterpart flap on an opposite side of the aircraft. If one track jams, the sensors on opposite sides of the aircraft result in different readings, which may signal that a jam exists.

Additionally, the systems and methods described herein are small and lightweight, with no, minimal, or reduced performance impacts to the aircraft, as compared to prior known solutions. The system can allow the use of a main-auxiliary-main configuration for long and thin flaps on small wing planforms with no, minimal, or reduced performance penalty, and can potentially allow an even longer flap. The system can also be used on a flap main support to quickly detect jams or pin failures on a normal flap carriage.

FIG. 1 illustrates a schematic block diagram of a jam detection system 100 for an aircraft 102, according to an example of the present disclosure. The aircraft 102 includes wings, such as the wing 104. The wing 104 includes a flap 106 and a support 108 coupled to the flap 106. In at least one example, the support 108 is a mid-idler support. As another example the support 108 is a main support.

The support 108 includes a bracket 110 having a track 112. A carriage 114 having one or more rollers is moveable coupled to the track 112. For example, the one or more rollers are moveably secured to and/or within the track 112.

The jam detection system 100 includes a linkage 116 coupled to the flap 106 and the carriage 114 moveably coupled to the support 108. The linkage 116 includes one or more bars, arms, rods, and/or the like. A sensor 118 is configured to detect a position of the linkage 116, such as in relation to the support 108. In at least one example, the sensor 118 is a rotary variable displacement transducer that is configured to detect an angular position of at least a portion of the linkage 116. As another example, the sensor 118 is a linear variable displacement transducer configured to detect a linear position of at least a portion of the linkage 116. As another example, the sensor 118 is an encoder that is configured to detect one or more of an angular position, a linear position, and/or the like of the linkage 116.

The sensor 118 is communicatively coupled to a control unit 120, such as through one or more wired or wireless connections. The control unit 120 is configured to control operation of the flap 106, such as by controlling motion of the flap 106 between a retracted position and extended position. The control unit 120 is further in communication with one or more actuators coupled to the flap, such as through one or more wired or wireless connections. For example, the control unit 120 is in communication with actuators of main supports coupled to the flap 106. The support 108 may or may not include an actuator. For example, the support 108 can be a mid-idler support that is devoid of an actuator. Optionally, the support 108 can be a main support that includes an actuator.

The control unit 120 can be located at various locations of the aircraft 102. For example, the control unit 120 can be disposed within the wing 104. As a further example, the control unit 120 can be disposed within an actuator coupled to the flap 106. As another example, the control unit 120 can be remote from the wing 104, such as within a fuselage of the aircraft 102.

In operation, the flap 106 is moved between a retracted position and an extended position, such as via one or more actuators coupled to the flap 106. As the flap 106 moves, the linkage 116 moves in response thereto, as the linkage 116 is coupled to the support 108 and the flap 106. The sensor 118 detects the motion of the linkage 116. Data regarding normal motion (that is, expected motion in which there is no jam) of the flap 106 is stored in a memory, such a memory of, and/or in communication with, the control unit 120. Normal motion of the flap 106 is calibrated with a known motion of the linkage 116. When the sensor 118 detects such normal motion (such as less than a predetermined jam threshold, for example, within 1% or less deviation from the predetermined normal motion), the sensor 118 refrains from outputting a jam signal to the control unit 120. Also, a pilot may be notified that there has been an anomaly in the flap drive system so proper measures can be taken.

If, however, the sensor 118 detects motion of the linkage 116 that exceeds the predetermined jam threshold, such as an angular or linear motion of a portion of the linkage 116 that exceeds the predetermined jam threshold, the sensor 118 outputs a jam signal 122 to the control unit 120. The control unit 120 receives the jam signal 122. In response to receiving the jam signal 122, the control unit 120 ceases motion of the flap 106, such as by ceasing operation of the one or more actuators coupled to the flap 106. In this manner, potential damage to the support 108, the flap 106, or other portions of the wing 104 is eliminated, minimized, or otherwise reduced.

As described herein the jam detection system 100 for the flap 106 of the wing 104 of the aircraft 102 includes the linkage 116 coupled to the flap 106 and the carriage 114 moveably coupled to the support 108 of the wing 104. The sensor 118 is configured to detect a position of at least a portion of the linkage 116. The sensor 118 is further configured to compare the position of the least a portion of the linkage 116 to a jam threshold to determine if a jam condition exists. If the position of the portion of the linkage meets or exceeds the jam threshold, the sensor 118 outputs the jam signal to the control unit 120, which stops one or more actuators that are configured to move the flap between a retracted position and an extended position.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 120 may be or include one or more processors that are configured to control operation, as described herein.

The control unit 120 is configured to execute a set of instructions that are stored in one or more data storage units or elements (such as one or more memories), in order to process data. For example, the control unit 120 may include or be coupled to one or more memories. The data storage units may also store data or other information as desired or needed. The data storage units may be in the form of an information source or a physical memory element within a processing machine.

The set of instructions may include various commands that instruct the control unit 120 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 120. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 120 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
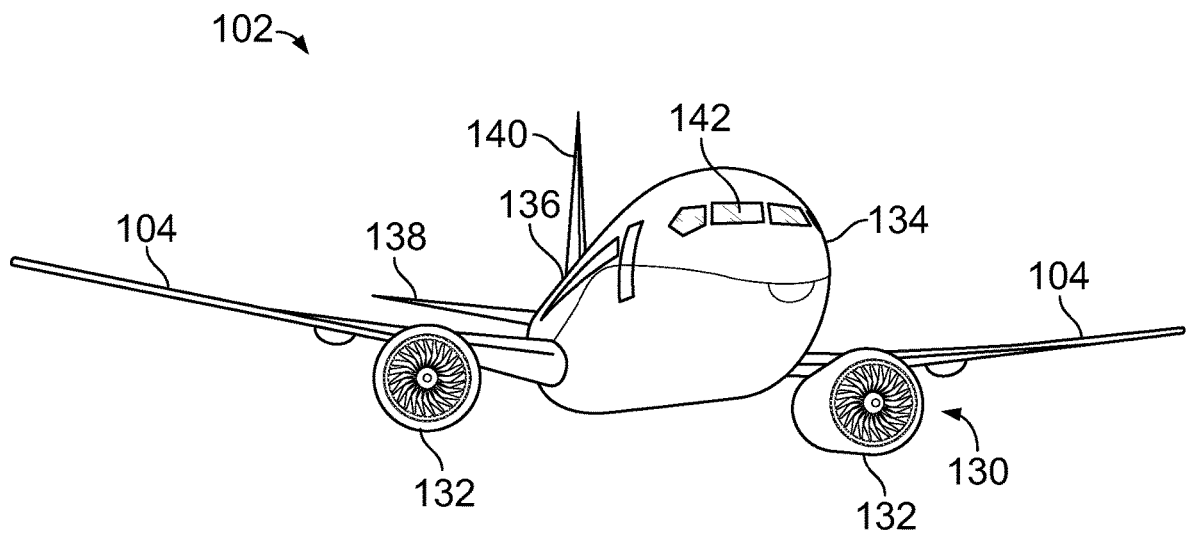
FIG. 2 illustrates a front perspective view of an aircraft, according to an example of the present disclosure.

FIG. 2 illustrates a front perspective view of an aircraft 102, according to an example of the present disclosure. The aircraft 102 includes a propulsion system 130 that can include two turbofan engines 132, for example. Optionally, the propulsion system 130 may include more engines 132 than shown. The engines 132 may be carried by wings 104 of the aircraft 102. In other examples, the engines 132 may be carried by a fuselage 134 and/or an empennage 136. The empennage 136 may also support horizontal stabilizers 138 and a vertical stabilizer 140. The fuselage 134 of the aircraft 102 defines an internal cabin, which may include a cockpit 142, one or more work sections (for example, galleys, personnel carry-on baggage areas, and the like), one or more passenger sections (for example, first class, business class, and coach sections), and/or the like.

The aircraft 102 as shown in FIG. 2 is merely exemplary. The aircraft 102 can be sized, shaped, and configured differently than shown.

Figure 3:
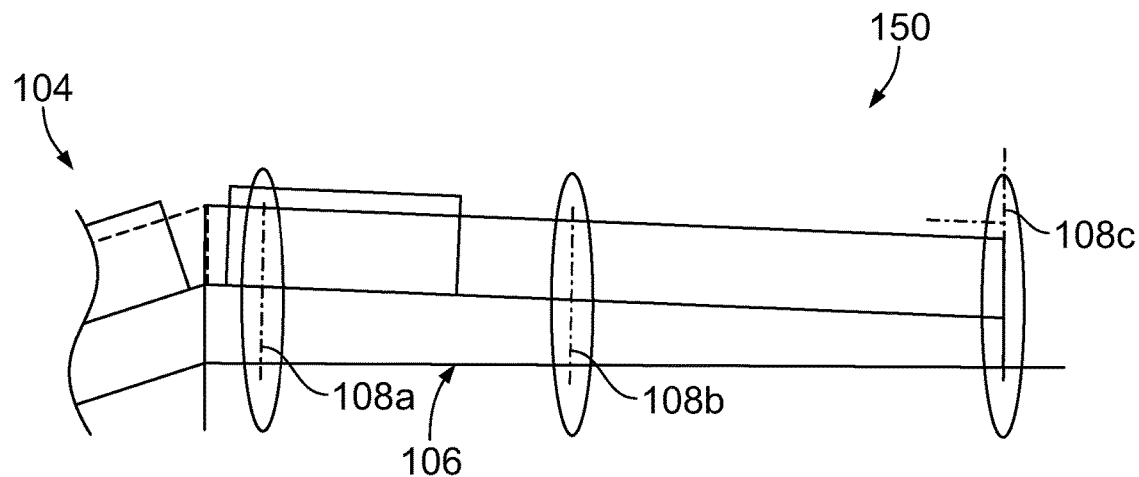
FIG. 3 illustrates a top plan view of a portion of a wing, according to an example of the present disclosure.

FIG. 3 illustrates a top plan view of a portion of a wing 104, according to an example of the present disclosure. The wing 104 includes a main body 150, and the flap 106 moveably coupled to the main body 150. In at least one example, the flap 106 is an inboard flap. Optionally, the flap 106 can be an outboard flap.

The flap 106 is coupled to the main body 150 through a plurality of supports 108a, 108b, and 108c. As an example, the support 108a is a first (for example, an outboard) main support, the support 108b is a mid-idler support, and the support 108c is a second (for example, an inboard) main support. Long, thin flaps (inboard, mid, or outboard) often include a mid-idler support in order to provide full stroke deflection control. In at least one example, each of the supports 108a and 108c includes an actuator, and the support 108b is devoid of an actuator. Alternatively, the support 108b can include an actuator. Referring to FIGS. 1-3, the jam detection system 100 is coupled to one of the supports 108a, 108b, or 108c. For example, the jam detection system 100 is coupled to the support 108b. In at least one other example, a jam detection system 100 can be coupled to each of two or more of the supports 108a, 108b, and 108c. For example, a jam detection system 100 can be coupled to each of the supports 108a, 108b, and 108c.

Figure 4:
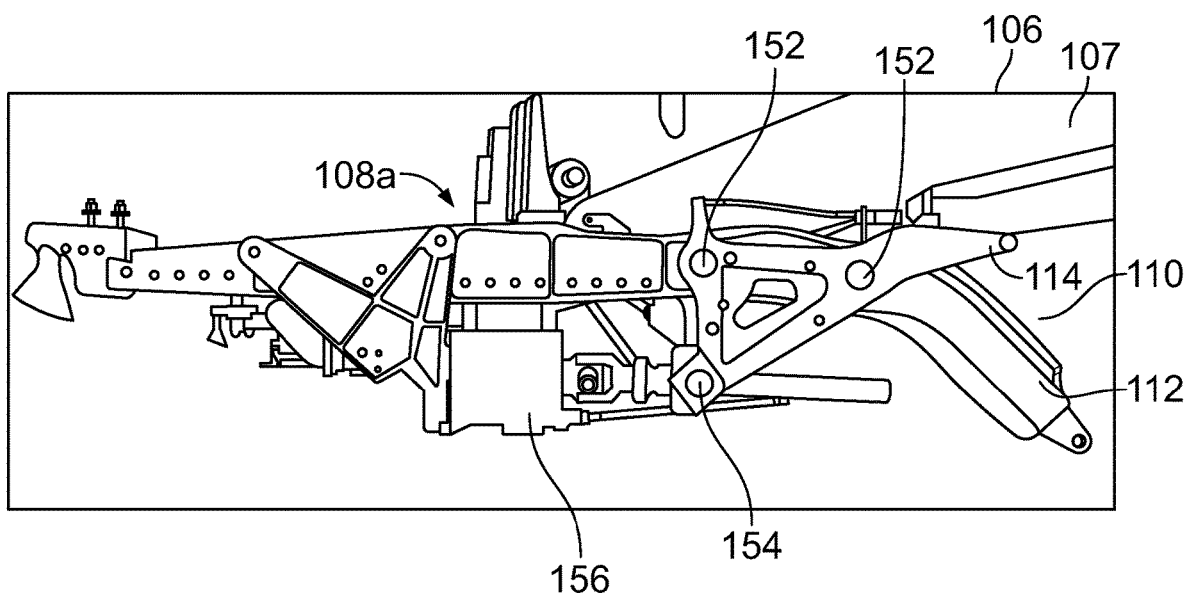
FIG. 4 illustrates a lateral view of a support coupled to a flap, according to an example of the present disclosure.

FIG. 4 illustrates a lateral view of the support 108a coupled to the flap 106, according to an example of the present disclosure. The support 108c can be coupled to the flap 106 similar as shown in FIG. 4.

The support 108c includes a bracket 110 that is secured (for example, fixed in relation to) the main body 150 (shown in FIG. 3). The bracket 110 includes a track 112. A carriage 114 includes one or more rollers 152 moveably secured within the track 112. The carriage 114 also includes a pivot member 154 (such as an axle, roller, and/or the like) that is moveably coupled to an actuator 156. The carriage 114 is further pivotally coupled to an underside 107 of the flap 106, such as through one or more pivot members, hinges, and/or the like.

Referring to FIGS. 1-4, the actuator 156 of the support 108a (and optionally, the support 108c) drives motion of the flap 106 between a retracted position and an extended position. The control unit 120 controls operation of the actuator 156 to drive motion of the flap 106.

Figure 5:
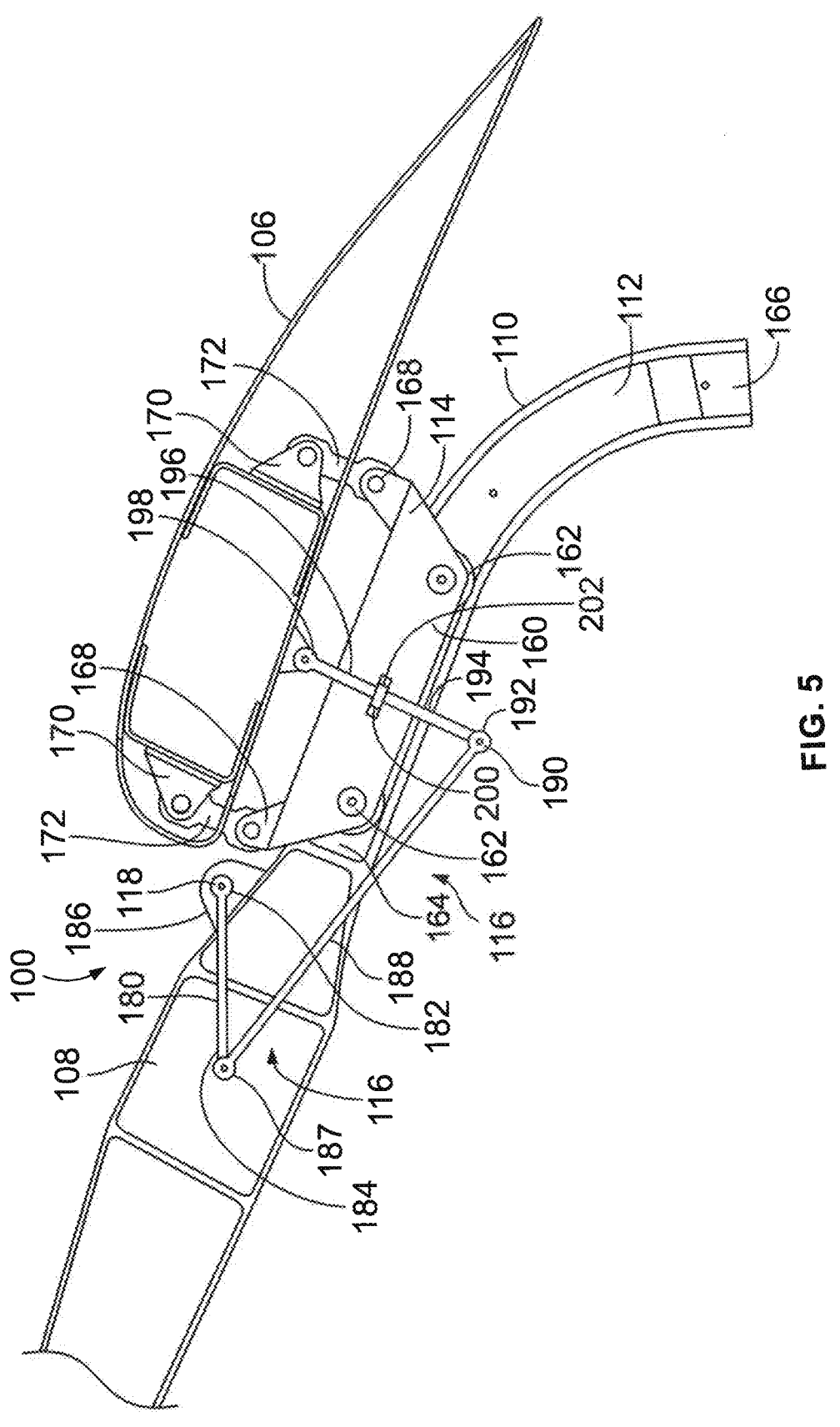

FIG. 5 illustrates a lateral view of the jam detection system 100 coupled to a support 108 and a flap 106 in a retracted position, according to an example of the present disclosure. The support 108 can be one of the supports 108a, 108b, and 108c, shown in FIG. 3. For example, the support 108 is the support 108b, which is a mid-idler support that is devoid of an actuator.

The carriage 114 includes a housing 160 including rollers 162 moveably secured within the track 112, which includes a defined range between a fore stop 164 and an aft end 166. Pivot hinges 168 extend upwardly from the housing 160 and pivotally couple to reciprocal pivot hinges 170 of the flap 106 through pivot arms 172. The carriage 114 can pivotally couple to the flap 106 through one or more pivot hinges 170 and pivot arms 172 than shown.

As noted, the jam detection system 100 includes the linkage 116. In at least one embodiment, the linkage 116 includes a first link arm 180 having a first end 182 and a second end 184. The first link arm 180 can be a linear rod, beam, column, or the like. The first end 182 is pivotally coupled to a fixed portion of the bracket 110, such as a securing member 186 (for example, a fin, bracket, prong, body portion, or the like of the bracket 110). The first end 182 is pivotally coupled to the bracket 110, such as through a pivot axle, pin, or the like.

The second end 184 of the first link arm 180 is pivotally coupled to a first end 187 of second link arm 188. The second link arm 188 can be a linear rod, beam, column, or the like. The second link arm 188 includes a second end 190 that is pivotally coupled to a first end 192 of a third link arm 194, which can also be a linear rod, beam, column, or the like. The third link arm 194 includes an intermediate body 196 between the first end 192 and a second end 198. The intermediate body 196 passes through a spherical bearing 200 rotatably retained within a ring coupling 202 extending outwardly from the housing 160 of the carriage 114. The second end 198 of the third link arm 194 is pivotally coupled to a portion of the flap 106, such as via a fin, bracket, prong, body portion, or the like.

In at least one example, the sensor 118 is coupled to the first link arm 180. For example, the sensor 118 is coupled between the first end 182 of the first link arm 180 and the securing member 186. The sensor 118 can be secured to the first end 182. Optionally, the sensor 118 can be secured to the securing member 186. In at least one other example, the sensor 118 can be secured between the first end 182 and the second end 184 of the first link arm 180.

In at least one embodiment, the sensor 118 is a rotary variable displacement transducer that is configured to detect an angular position of the first link arm 180 at all points within the range between the retracted position of the flap 106, as shown in FIG. 5, and a fully extended position. As such, the sensor 118 is configured to detect a position of at least a portion of the linkage 116, and therefore the relative positions of the flap 106 and the support 108, throughout a range of motion of the flap 106 between the retracted position and the fully extended position.

The sensor 118 is configured to distinguish between normal motion of the linkage 116 during motion of the flap, and motion that deviates from the normal motion. For example, the sensor 118 can be programmed to recognize the normal motion between the retracted position (as shown in FIG. 5) and the fully extended position of the flap 106, and deviated motion therefrom, which indicates a jam condition. The sensor 118 is calibrated to recognize the normal motion, and identify a deviation from the normal motion. For example, if the angular position of the first link arm 180 deviates from a predetermined jam threshold of +/−5 degrees from the calibrated normal motion, the sensor 118 outputs the jam signal 122 to the control unit 120 (shown in FIG. 1), which then ceases operation of the one or more actuators that drive motion of the flap 106. Optionally, the predetermined jam threshold can be greater or less than +/−5 degrees. For example, the predetermined jam threshold can be +/−1 degree. As another example, the predetermined jam threshold can be +/−3 degrees. As another example, the +/−6 degrees.

As shown and described with respect to FIG. 5, the sensor 118, such as rotary variable displacement transducer, is configured to detect an angular position of a portion of the linkage 116, such as an angular position of the first link arm 180, to determine whether or not a jam condition exists. If the angular position of the portion of the linkage 116 is less than the predetermined jam threshold, then the sensor 118 does not output the jam signal 122. If, however, the angular position of the portion of the linkage 116 meets or exceeds the predetermined jam threshold, the sensor 118 outputs the jam signal 122 to the control unit 120, which stops the actuator(s) 156 (shown in FIG. 4), thereby preventing or otherwise reducing a potential of damage to the flap 106, the support 108, and/or other portions of the wing 104.

As shown, the sensor 118 is configured to detect angular motion of the first link arm 180. Optionally, the sensor 118 can be disposed at various other portions of the support 108 and/or linkage 116. As another option, the sensor 118 can be disposed to detect angular positions of other portions of the linkage 116, such as the second link arm 188 or the third link arm 194. As another example, the sensor 118 can be a linear variable displacement transducer configured to detect a linear position of a portion of the linkage 116, such as may be or include a telescoping link arm.

Figure 6:
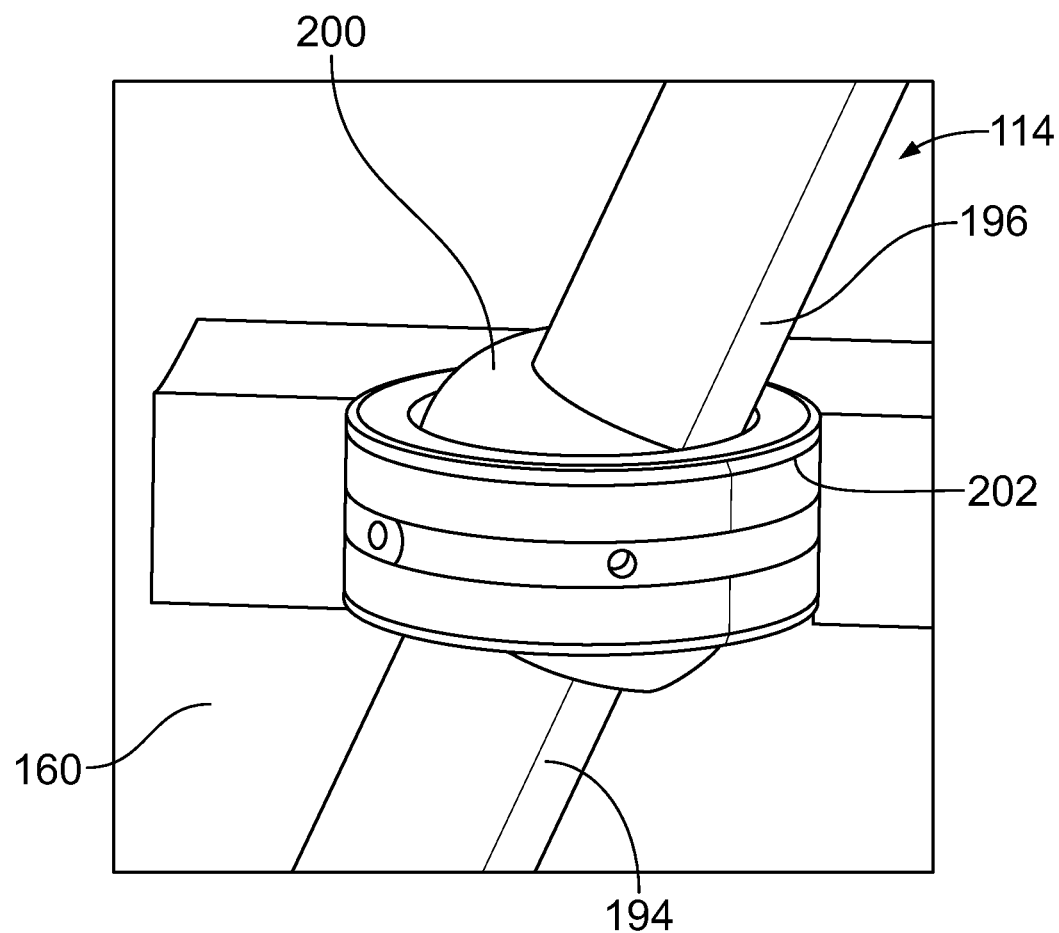
FIG. 6 illustrates a perspective lateral view of an intermediate body of a third link arm passing through a spherical bearing rotatably retained within a ring coupling extending outwardly from a housing of a carriage, according to an example of the present disclosure.

FIG. 6 illustrates a perspective lateral view of the intermediate body 196 of the third link arm 194 passing through the spherical bearing 200 rotatably retained within a ring coupling 202 extending outwardly from the housing 160 of the carriage 114. The spherical bearing 200 rotatably secures to the ring coupling 202, thereby moveably coupling the third link arm 194 to the carriage 114, and allows the third link arm 194 to rotate through various degrees of freedom in relation to the carriage 114. Referring to FIGS. 5 and 6, the linkage 116 directly couples to the carriage 114 through the spherical bearing 200, and indirectly couples to the carriage 114 through the second end 198 of the third link arm 194 pivotally coupling to the flap 106. Alternatively, the third link arm 194 may not couple to the carriage 114 via the spherical bearing 200.

Figure 7:
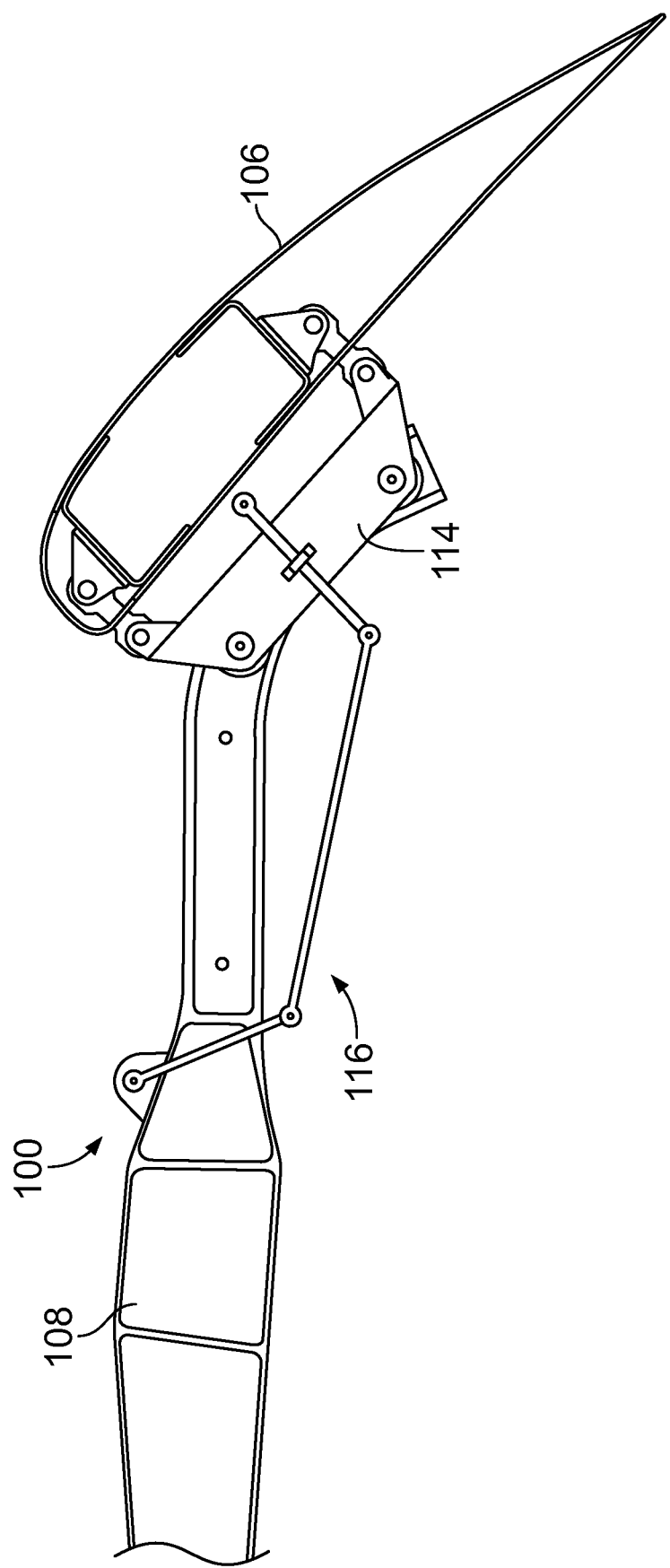
FIG. 7 illustrates a lateral view of the jam detection system coupled to a support and a flap in a fully extended position, according to an example of the present disclosure.

FIG. 7 illustrates a lateral view of the jam detection system 100 coupled to the support 108 and the flap 106 in a fully extended position, according to an example of the present disclosure. Referring to FIGS. 1, 5, and 7, the sensor 118 is configured to detect the position (for example, angular position) of at least a portion of the linkage 116 through a full range of motion of the flap 106 (such as between the retracted position shown in FIG. 5 and the fully extended position shown in FIG. 7) in order to determine the presence of a jam of the flap 106. As described, the sensor 118 compares the position of at least a portion of the linkage 116 in relation to a jam threshold. If the position of the portion of the linkage 116 meets or exceeds the jam threshold, the sensor 118 outputs the jam signal 122 to the control unit 120, which, in response, stops the actuator(s) 156 (shown in FIG. 3).

FIGS. 5-7 show flap motion in nominal conditions. That is, FIGS. 5-7 show flap motion free of any jams.

Figure 8:
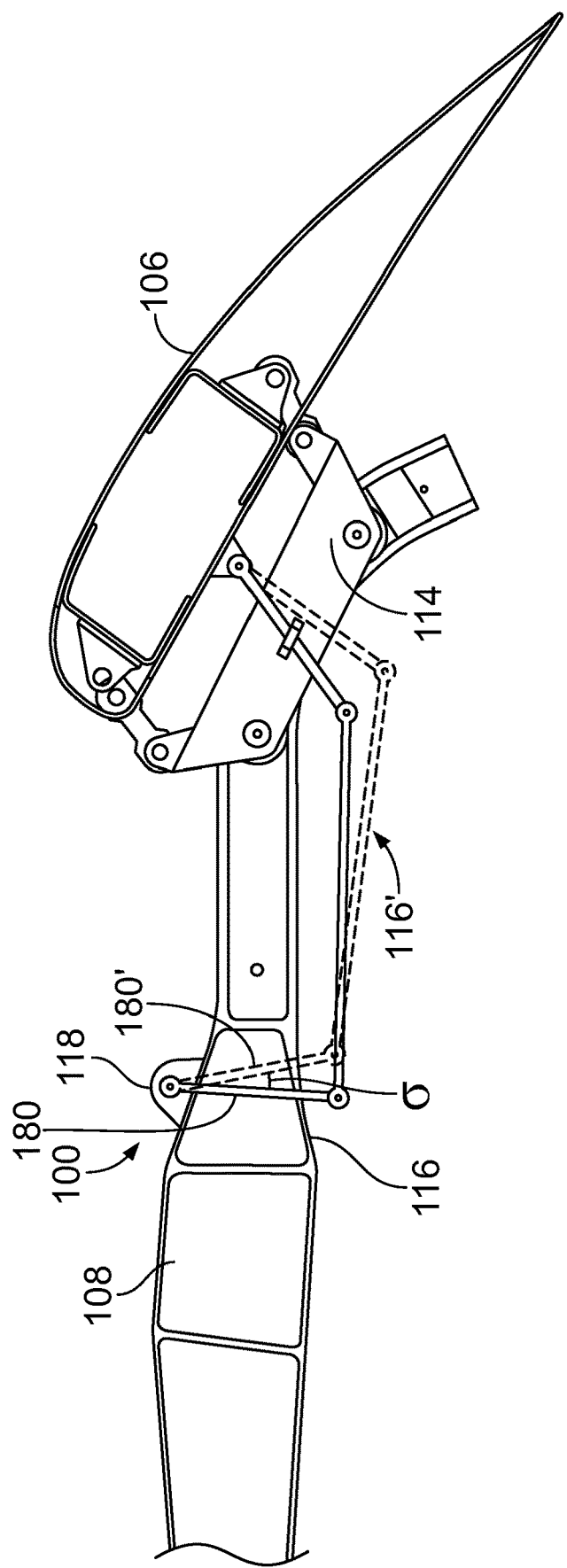
FIG. 8 illustrates a lateral view of the jam detection system coupled to the support and the flap in a first jam condition, according to an example of the present disclosure.
Figure 9:
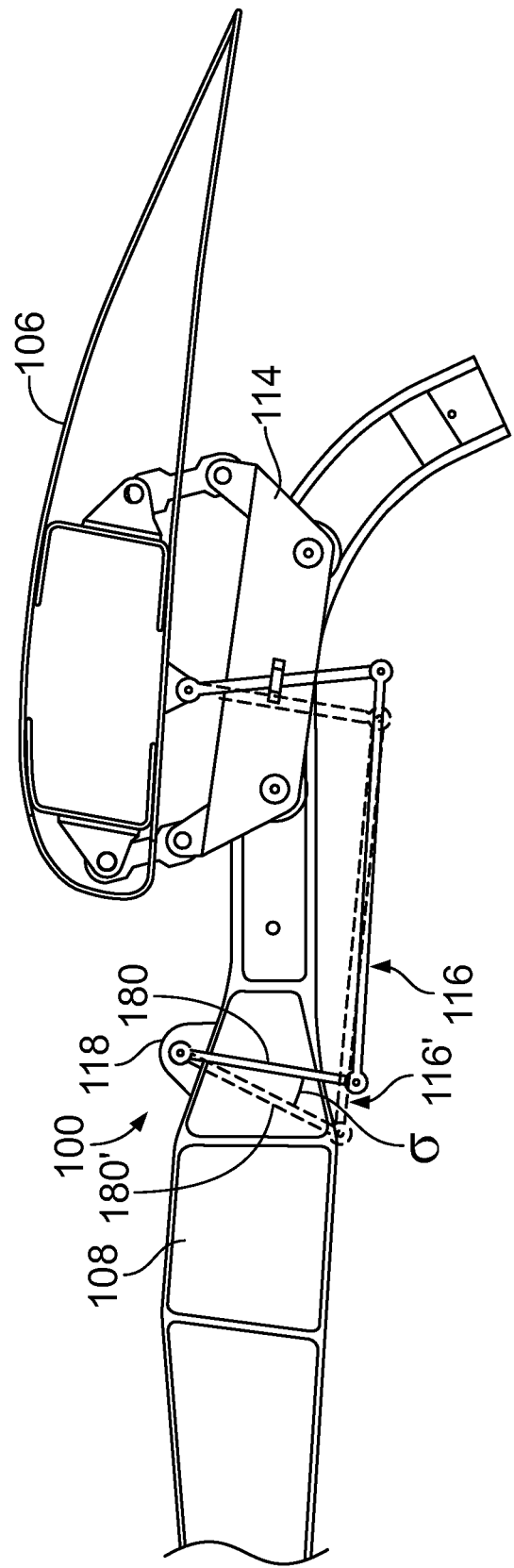
FIG. 9 illustrates a lateral view of the jam detection system coupled to the support and the flap in a second jam condition, according to an example of the present disclosure.

FIG. 8 illustrates a lateral view of the jam detection system 100 coupled to the support 108 and the flap 106 in a first jam condition, according to an example of the present disclosure. FIG. 9 illustrates a lateral view of the jam detection system 100 coupled to the support 108 and the flap 106 in a first jam condition, according to an example of the present disclosure. The jam condition shown in FIG. 8 occurs at 80% stroke while the flap is extending. The jam condition shown in FIG. 9 occurs at 50% stroke while the flap is retracting. FIGS. 8 and 9 show examples of jam conditions. It is to be understood that various other jam conditions can exist between the retracted position and the fully extended position. The dashed lines 116' represent the expected position of the linkage 116 (as recognized by the sensor 118) during the motion of the flap 106.

Referring to FIGS. 1, 8, and 9, the sensor 118 detects the position of the first link arm 180 and compares the position against the expected position 180'. An angular deviation θ between the first link arm 180 at its actual position and the expected position 180' is present. If the angular deviation θ meets or exceeds the jam threshold, such as shown in FIG. 8, the sensor 118 outputs the jam signal 122, as described herein.

Figure 10:
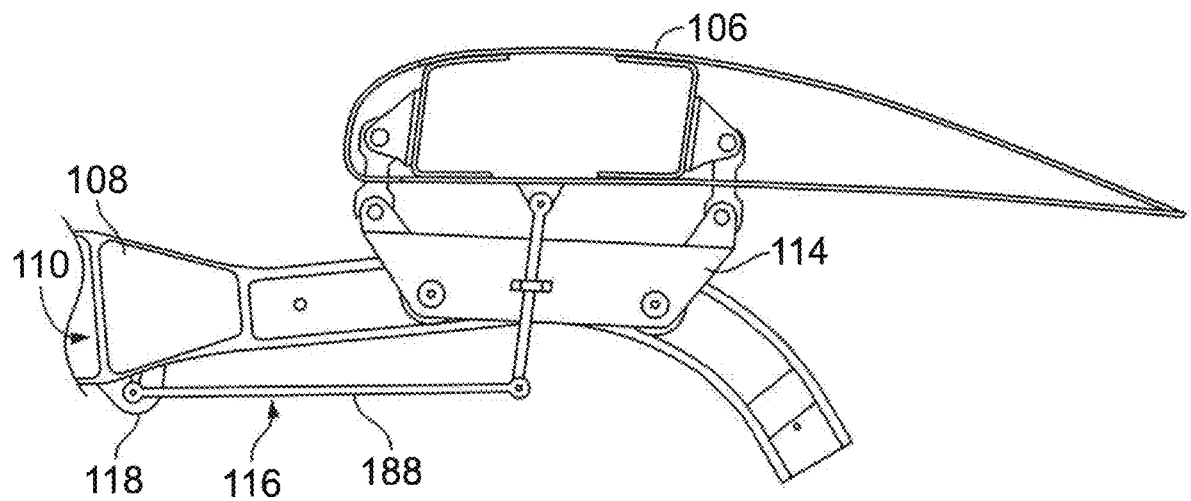
FIG. 10 illustrates a lateral view of the jam detection system coupled to a support and a flap, according to an example of the present disclosure.

FIG. 10 illustrates a lateral view of the jam detection system 100 coupled to a support 108 and a flap 106, according to an example of the present disclosure. In this example, the sensor 118 is a linear variable displacement transducer configured to detect a linear position of a portion of the linkage 116, such as the link arm 188, which is coupled to the support 108. The link arm 188 can be a telescoping arm that is configured to retract and extend, thereby changing lengths. The sensor 118 detects the changing length of the link arm 188 through a range of motion of the flap 106 and compares the length to a jam threshold to determine the existence of a jam.

Figure 11:
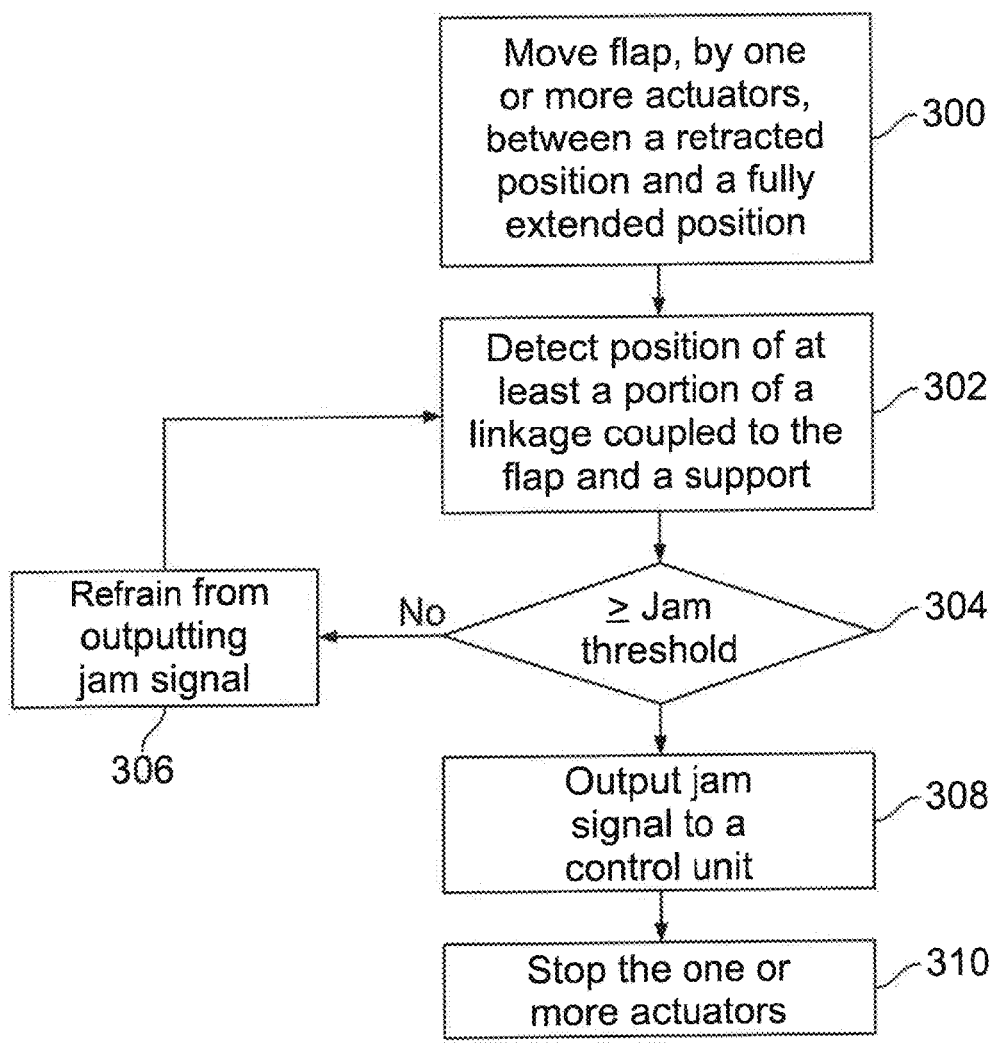
FIG. 11 illustrates a flow chart of a jam detection method, according to an example of the present disclosure.

FIG. 11 illustrates a flow chart of a jam detection method, according to an example of the present disclosure. Referring to FIGS. 1-11, at 300, the flap 106 is moved, such as by one or more actuators 156, between a retracted position and a fully extended position (for example, from the retracted position to the fully extended position, from the fully extended position to the retracted position, and all points in-between). At 302, the sensor 118 detects a position of at least a portion of the linkage 116 coupled to the flap 106 and the support 108. At 304, the sensor 118 determines if the position of the portion of the linkage 116 equals or exceeds the predetermined jam threshold (such as by comparing the position to the predetermined jam threshold). If not, the method proceeds to 306, at which the sensor 118 refrains from outputting the jam signal 122.

If, however, the position of the portion of the linkage 116 equals or exceeds the predetermined jam threshold, the method proceeds from 304 to 308, at which the sensor 118 outputs the jam signal 122 to the control unit 120. In response to receiving the jam signal 122, the control unit 120 stops the one or more actuators 156.

Further, the disclosure comprises examples according to the following clauses:

Clause 1. A jam detection system for a flap of a wing of an aircraft, the jam detection system comprising:
  a linkage coupled to the flap and a support of the wing; and
  a sensor configured to detect a position of at least a portion of the linkage, wherein the sensor is further configured to compare the position of the least a portion of the linkage to a jam threshold to determine if a jam condition exists.

Clause 2. The jam detection system of Clause 1, wherein the linkage is further coupled to a carriage moveably coupled to the support.

Clause 3. The jam detection system of Clauses 1 or 2, wherein the sensor is further configured to output a jam signal in response to the position of the portion of the linkage meeting or exceeding the jam threshold, and wherein, in response to receiving the jam signal, a control unit is configured to stop one or more actuators that are configured to move the flap between a retracted position and an extended position.

Clause 4. The jam detection system of any of Clauses 1-3, wherein the support is a mid-idler support between a first main support and a second main support.

Clause 5. The jam detection system of any of Clauses 1-4, wherein the support is devoid of an actuator.

Clause 6. The jam detection system of any of Clauses 1-5, wherein the sensor is a rotary variable displacement transducer configured to detect an angular position of the at least a portion of the linkage.

Clause 7. The jam detection system of any of Clauses 1-5, wherein the sensor is a linear variable displacement transducer configured to detect a linear position of the at least a portion of the linkage.

Clause 8. The jam detection system of any of Clauses 1-7, wherein the linkage comprises:
  a first link arm pivotally coupled to a bracket of the support;
  a second link arm pivotally coupled to the first link arm; and
  a third link arm pivotally coupled to the second link arm and the flap.

Clause 9. The jam detection system of Clause 8, wherein the third link arm is coupled to a carriage that is moveably coupled to the support by a spherical bearing.

Clause 10. The jam detection system of Clauses 8 or 9, wherein the sensor is configured to detect an angular position of the first link arm.

Clause 11. A jam detection method for a flap of a wing of an aircraft, the jam detection method comprising:
  detecting, by a sensor, a position of at least a portion of a linkage coupled to the flap and a support of the wing; and
  comparing, by the sensor, the position of the at least a portion of the linkage to a jam threshold to determine if a jam condition exists.

Clause 12. The jam detection method of Clause 11, wherein the linkage is further coupled to a carriage moveably coupled to the support.

Clause 13. The jam detection method of Clauses 11 or 12, further comprising:
  outputting, by the sensor, a jam signal in response to the position of the portion of the linkage meeting or exceeding the jam threshold; and
  in response to receiving the jam signal, stopping, by a control unit, one or more actuators that are configured to move the flap between a retracted position and an extended position.

Clause 14. The jam detection method of any of clauses 11-13, wherein the support is a mid-idler support between a first main support and a second main support, and wherein the mid-idler support is devoid of an actuator.

Clause 15. The jam detection method of any of Clauses 11-14, wherein said detecting comprises detecting an angular position of the at least a portion of the linkage.

Clause 16. The jam detection method of any of Clauses 11-14, wherein said detecting comprised detecting a linear position of the at least a portion of the linkage.

Clause 17. The jam detection method of any of Clauses 11-16, wherein the linkage comprises:
  a first link arm pivotally coupled to a bracket of the support;
  a second link arm pivotally coupled to the first link arm; and
  a third link arm pivotally coupled to the second link arm and the flap.

Clause 18. The jam detection method of Clause 17, wherein the third link arm is coupled to a carriage that is moveably coupled to the support by a spherical bearing.

Clause 19. The jam detection method of Clauses 17 or 18, wherein said detecting comprises detecting an angular position of the first link arm.

Clause 20. An aircraft comprising:
  a wing having a flap and a support; and
  a jam detection system comprising:
    a linkage coupled to the flap, the support, and a carriage moveably coupled to the support; and
    a sensor configured to detect a position of at least a portion of the linkage, wherein the sensor is further configured to compare the position of the least a portion of the linkage to a jam threshold to determine if a jam condition exists; and
  a control unit in communication with the sensor, wherein the sensor is further configured to output a jam signal in response to the position of the portion of the linkage meeting or exceeding the jam threshold, and wherein, in response to receiving the jam signal, a control unit is configured to stop one or more actuators that are configured to move the flap between a retracted position and an extended position.

As described herein, examples of the present disclosure provide an efficient and effective system and method for detecting a jam in relation to a support for a flap of a wing of an aircraft. Further, examples of the present disclosure provide jam detection systems and methods well-suited for a mid-idler support of a flap of a wing of an aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A jam detection system for a flap of a wing of an aircraft, the jam detection system comprising:
  a linkage coupled to the flap, a support of the wing, and a carriage moveably coupled to the support;
  a spherical bearing rotatably retained within a ring coupling extending outwardly from the carriage, wherein a portion of the linkage passes through the spherical bearing; and a sensor configured to detect a position of one or more portions of the linkage, wherein the sensor is further configured to compare the position of the one or more portions of the linkage to a jam threshold to determine if a jam condition exists.

2. The jam detection system of claim 1, wherein the sensor is further configured to output a jam signal in response to the position of the one or more portions of the linkage meeting or exceeding the jam threshold, and wherein, in response to receiving the jam signal, a control unit is configured to stop one or more actuators that are configured to move the flap between a retracted position and an extended position.

3. The jam detection system of claim 1, wherein the support is a mid-idler support between a first main support and a second main support.

4. The jam detection system of claim 1, wherein the support is devoid of an actuator.

5. The jam detection system of claim 1, wherein the sensor is a rotary variable displacement transducer configured to detect an angular position of the one or more portions of the linkage.

6. The jam detection system of claim 1, wherein the sensor is a linear sensor configured to detect a linear position of the one or more portions of the linkage.

7. The jam detection system of claim 1, wherein the linkage comprises:
a first link arm pivotally coupled to a bracket of the support;
a second link arm pivotally coupled to the first link arm; and
a third link arm pivotally coupled to the second link arm and the flap.

8. The jam detection system of claim 7, wherein the third link arm is coupled to the carriage that is moveably coupled to the support by the spherical bearing.

9. The jam detection system of claim 7, wherein the sensor is configured to detect an angular position of the first link arm.

10. The jam detection system of claim 1, wherein the carriage comprises one or more rollers moveably coupled to a track of the support.

11. The jam detection system of claim 1, wherein the linkage comprises:
a first link arm having a first end and a second end, wherein the first end is pivotally coupled to a fixed portion of a bracket of the support;
a second link arm having a third end and a fourth end, wherein the second end of the first link arm is pivotally coupled to the third end of the second link arm; and
a third link arm having a fifth end, a sixth end, and an intermediate body between the fifth end and the sixth end, wherein the fourth end of the second link arm is pivotally coupled to the fifth end of the third link arm, wherein the sixth end is pivotally coupled to a portion of the flap, and wherein the portion of the linkage is the intermediate body of the third link arm passing through the spherical bearing.

12. A jam detection method for a flap of a wing of an aircraft, the jam detection method comprising:
detecting, by a sensor, a position of one or more portions of a linkage coupled to the flap, a support of the wing, and a carriage moveably coupled to the support, wherein a spherical bearing is rotatably retained within a ring coupling extending outwardly from the carriage, and wherein a portion of the linkage passes through the spherical bearing; and
comparing, by the sensor, the position of the one or more portions of the linkage to a jam threshold to determine if a jam condition exists.

13. The jam detection method of claim 12, further comprising:
outputting, by the sensor, a jam signal in response to the position of the one or more portions of the linkage meeting or exceeding the jam threshold; and
in response to receiving the jam signal, stopping, by a control unit, one or more actuators that are configured to move the flap between a retracted position and an extended position.

14. The jam detection method of claim 12, wherein the support is a mid-idler support between a first main support and a second main support, and wherein the mid-idler support is devoid of an actuator.

15. The jam detection method of claim 12, wherein said detecting comprises detecting an angular position of the one or more portions of the linkage.

16. The jam detection method of claim 12, wherein said detecting comprises detecting a linear position of the one or more portions of the linkage.

17. The jam detection method of claim 12, wherein the linkage comprises:
a first link arm pivotally coupled to a bracket of the support;
a second link arm pivotally coupled to the first link arm; and
a third link arm pivotally coupled to the second link arm and the flap.

18. The jam detection method of claim 17, wherein the third link arm is coupled to the carriage that is moveably coupled to the support by the spherical bearing.

19. The jam detection method of claim 17, wherein said detecting comprises detecting an angular position of the first link arm.

20. An aircraft comprising:
a wing having a flap and a support; and
a jam detection system comprising:
a linkage coupled to the flap, the support, and a carriage moveably coupled to the support;
a spherical bearing rotatably retained within a ring coupling extending outwardly from the carriage, wherein a portion of the linkage passes through the spherical bearing; and
a sensor configured to detect a position of one or more portions of the linkage, wherein the sensor is further configured to compare the position of the one or more portions of the linkage to a jam threshold to determine if a jam condition exists; and
a control unit in communication with the sensor, wherein the sensor is further configured to output a jam signal in response to the position of the one or more portions of the linkage meeting or exceeding the jam threshold, and wherein, in response to receiving the jam signal, a control unit is configured to stop one or more actuators that are configured to move the flap between a retracted position and an extended position.

* * * * *